United States Patent
Lamar et al.

(10) Patent No.: US 11,303,116 B2
(45) Date of Patent: Apr. 12, 2022

(54) METHODS AND APPARATUS FOR ELECTRICAL OVERSTRESS PROTECTION

(71) Applicant: Allegro MicroSystems, LLC, Manchester, NH (US)

(72) Inventors: Washington Lamar, Mont Vernon, NH (US); Maxim Klebanov, Palm Coast, FL (US); Sundar Chetlur, Bedford, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 155 days.

(21) Appl. No.: 16/115,901

(22) Filed: Aug. 29, 2018

(65) Prior Publication Data

US 2020/0076189 A1 Mar. 5, 2020

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC ..................... H02H 1/0007; H02H 9/041–046
See application file for complete search history.

(56) References Cited

U.S. PATENT DOCUMENTS

| | | | | |
|---|---|---|---|---|
| 5,539,327 A * | 7/1996 | Shigehara | ........... | H01L 27/0251 257/361 |
| 5,907,464 A * | 5/1999 | Maloney | ............. | H01L 27/0266 361/111 |
| 6,671,153 B1 * | 12/2003 | Ker | ..................... | H01L 27/0262 361/111 |
| 7,573,691 B2 * | 8/2009 | Pant | .................... | H01L 27/0285 361/111 |
| 7,701,682 B2 * | 4/2010 | Goyal | .................... | H02H 9/046 361/111 |
| 8,643,988 B1 * | 2/2014 | Kwong | .................. | H02H 9/046 361/118 |
| 8,922,962 B2 | 12/2014 | Lamar et al. | | |
| 9,318,481 B1 | 4/2016 | Wang et al. | | |
| 9,451,669 B2 * | 9/2016 | Werner | .................. | H05B 45/54 |
| 9,866,014 B2 | 1/2018 | Klebanov et al. | | |
| 9,941,224 B2 | 4/2018 | Lamar et al. | | |
| 2001/0043449 A1 * | 11/2001 | Okushima | ........... | H01L 27/0255 361/56 |
| 2002/0030539 A1 * | 3/2002 | Sher | ................. | G11C 29/12005 327/541 |
| 2004/0217425 A1 * | 11/2004 | Brodsky | ............. | H01L 27/0248 257/360 |
| 2008/0232010 A1 * | 9/2008 | Wang | .................. | H01L 27/0255 361/56 |
| 2010/0296212 A1 * | 11/2010 | Liang | ..................... | H02H 9/046 361/56 |

(Continued)

*Primary Examiner* — Fred E Finch, III
(74) *Attorney, Agent, or Firm* — Daly, Crowley, Mofford & Durkee, LLP (57) ABSTRACT

An electronic device having first and second terminals includes an electrical overstress (EOS) protection circuitry configured to detect an EOS event at one or both of the first and second terminals. The electronic device includes a power clamp coupled to the EOS protection circuitry and configured to clamp a voltage between the first terminal and the second terminal to a clamp voltage. The EOS protection circuitry can adjust the clamp voltage when an EOS event is detected.

12 Claims, 4 Drawing Sheets

(56) References Cited

U.S. PATENT DOCUMENTS

| | | | |
|---|---|---|---|
| 2014/0355157 A1* | 12/2014 | Huang | H02H 9/046 361/56 |
| 2015/0043116 A1* | 2/2015 | Weyers | H01L 27/0255 361/91.5 |
| 2016/0020603 A1* | 1/2016 | Parthasarathy | H02H 9/046 361/56 |
| 2016/0105173 A1* | 4/2016 | De Rooij | H03K 19/017509 327/109 |
| 2017/0019095 A1* | 1/2017 | Leong | H03K 17/687 |
| 2017/0250143 A1 | 8/2017 | Wilkinson et al. | |
| 2017/0365995 A1* | 12/2017 | Bahl | H03K 17/0822 |
| 2018/0061820 A1 | 3/2018 | Klebanov et al. | |
| 2018/0083442 A1 | 3/2018 | Lamar et al. | |
| 2019/0165571 A1* | 5/2019 | Batra | H01L 27/0288 |
| 2019/0267801 A1* | 8/2019 | Kumar | H01L 27/0266 |

\* cited by examiner

METHODS AND APPARATUS FOR ELECTRICAL OVERSTRESS PROTECTION

CROSS-REFERENCE TO RELATED APPLICATIONS

Not applicable.

STATEMENT REGARDING FEDERALLY SPONSORED RESEARCH

Not applicable.

FIELD

This disclosure relates generally to electrical overstress protection and, more particularly, to adjustable power clamping.

BACKGROUND

Electronic devices sometimes operate in environments that can damage the components and devices. Installation of a device in an automobile, for example, can expose electronic devices to wide swings in temperature as well as fluctuations in power. The power provided by automotive alternators and power regulators may provide power that fluctuates, especially during certain events such as start-up and shut-down of the vehicle. Devices used in manufacturing environments can also experience power fluctuations. If, for example, a power-hungry system or process draws on the manufacturing plant's electrical system, interruptions or fluctuations in power can occur that affect any device connected to the plant's power infrastructure. Electronic devices that can withstand power fluctuations without affecting operation provide benefits in these environments, especially if the electronic device is part of a safety system or other critical system such as an automotive braking system, an automotive transmission system, an automated robotic arm, etc.

Electronic devices may also be subject to electrical overstress ("EOS") conditions or events such as an electrostatic discharge ("ESD") event occurring between exposed pins or terminals of the device. These events can occur if there is a system fault or if the electronic device is exposed to an external charge. For example, the human body can store a charge that can correlate into a stored voltage as high as 25 kV.

When an electronic device is exposed to EOS conditions or events, the functional circuits of the electronic device are subject to voltages and currents associated with the EOS conditions or events. For example, if a charged body contacts an external terminal of the electronic device, that charge can be transferred to the functional circuits of the electronic device. Subjecting functional circuits to the voltages and currents associated with the EOS condition or event can cause interference to the operations of the functional circuits or physical damage to the functional circuits.

SUMMARY

According to the disclosure, an electronic device having first and second terminals includes an electrical overstress (EOS) protection circuitry configured to detect an EOS event at one or both of the first and second terminals. The electronic device includes a power clamp coupled to the EOS protection circuitry and configured to clamp a voltage between the first terminal and the second terminal to a clamp voltage. The EOS protection circuitry can adjust the clamp voltage when an EOS event is detected.

With this arrangement, EOS triggered power clamping is achieved. The EOS protection circuitry can be configured to adjust the clamp voltage of the power clamp. The clamp voltage can be adjusted according to the EOS protection circuitry detecting an EOS condition or event, thus allowing the power clamp to have a clamp voltage that is triggered by an EOS event.

Features may include one or more of the following individually or in combination with other features: In embodiments, the first and second terminals can be a power input terminal and a ground terminal. In embodiments, the EOS event can be a transient, an electrostatic discharge (ESD), and/or conducted immunity.

In embodiments, the power clamp can include at least two power clamp units. A capacitor can be coupled in parallel with at least one of the power clamp units and not coupled in parallel with at least one other of the power clamp units.

In embodiments, the power clamp includes one or more Zener diodes. In embodiments, the power clamp can have switching circuitry configured to adjust the clamp voltage of the power clamp. One or more power clamp units can be each coupled between terminals of the switching circuitry. Further, the clamp voltage can approximately equal to a breakdown voltage of the one or more power clamp units when an EOS event is not detected.

In embodiments, the EOS protection circuitry can include a driving circuitry that includes a control terminal coupled to a control terminal of a power clamp switching circuitry. Also, the EOS protection circuitry can be configured effectively short a respective power clamp unit when an EOS event is detected. Further, the EOS protection circuitry can also include one or more capacitors each coupled between terminals of a respective EOS protection circuitry.

In embodiments, the EOS protection circuitry can include at least one resistor and at least one capacitor. The EOS protection circuitry can be configured to detect the EOS event based upon values of the at least one resistor and at least one capacitor.

Also described is a method that includes detecting, with electrical overstress (EOS) protection circuitry, an EOS condition at one or both of first and second terminals of an electronic device. The method includes clamping, with a power clamp, a voltage between the first terminal and the second terminal to a first level when an EOS condition has not been detected and clamping the voltage between the first terminal and the second terminal to a second level, lower than the first level when an EOS condition has been detected.

In embodiments, the first and second terminals can be a power input terminal and a ground terminal. In embodiments, the EOS condition can be a transient, an electrostatic discharge (ESD), and/or conducted immunity. In embodiments, the power clamp can include at least two power clamp units.

In embodiments, at least one of the power clamp units can include one or more Zener diodes. Also, in embodiments, the power clamp can include at least one transistor coupled to at least one power clamp unit. The second level can be approximately equal to a breakdown voltage of the coupled at least one power clamp unit.

In embodiments, clamping the voltage between the first and second terminals to the second level can include placing at least one transistor coupled to at least one power clamp unit in a saturation region. This effectively shorts the at least one coupled power clamp unit when the EOS condition has been detected.

In embodiments, the method can also include clamping, with the power clamp, the voltage between the first and second terminals to a predetermined level based upon a type of EOS event detected.

Also describe herein is a system for electrostatic discharge (EOS) protection, that includes means coupled between a first terminal and a second terminal for detecting an EOS event. The system can also include means coupled to the EOS event detecting means for adjusting a clamp voltage of a power clamp when an EOS event is detected.

In embodiments, the power clamp can include one or more transistors coupled in parallel with one or more respective power clamp units. In embodiments, the system can also include means for placing at least one of the one or more transistors in a saturation region when an EOS event is detected.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Figure 1:
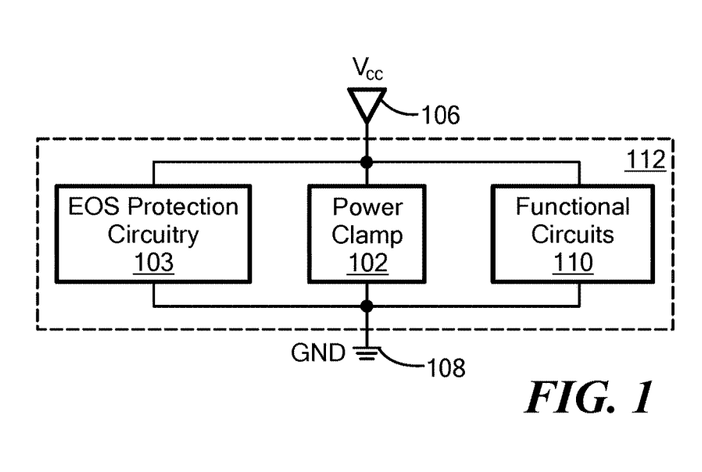
FIG. 1 is a block diagram of a circuit configured for voltage and electrical overstress (EOS) protection.

Referring now to FIG. 1, an electrical device 112, as may take the form of an integrated circuit ("IC"), includes at least two terminals 106, 108. Device 112 is configured for electrical overstress ("EOS") triggered power clamping and includes EOS protection circuitry 103, power clamp 102, and functional circuits 110. In embodiments, EOS protection circuitry 103, power clamp 102, and functional circuits 110 are coupled between first terminal 106 and second terminal 108 with EOS protection circuitry 103, power clamp 102, and functional circuits 110 being coupled in parallel relative to one another.

In embodiments, device 112 is connected to an external power supply (not shown) at at least one terminal 106, 108. The external power supply is configured to provide an AC or DC voltage (represented as VCC in FIG. 1) to device 112. The external power supply can include a wall outlet, voltage regulator, inverter, rectifier, transformer, flyback converter, boost converter, buck converter, boost-buck converter, battery, or any combination thereof—to name a few examples. In the illustrative embodiment of FIG. 1, device 112 is provided VCC from an external power supply at a first terminal 106.

In embodiments, device 112 can be connected to a reference potential, such as a ground at at least one terminal 106, 108. In the illustrative embodiment of FIG. 1, device 112 is connected to ground 108 at a second terminal 108.

In embodiments, a voltage provided to device 112 is provided to functional circuits 110. In embodiments, device 112 can take the form of a sensor, and functional circuits 110 can include analog and/or digital sensing circuitry that can take various forms, such as a magnetic field sensor, a pressure sensor, a temperature sensor, or a photo-electric sensor, or any combination thereof—to name a few examples. As used herein, the term "magnetic field sensor" is used to describe a circuit that uses one or more magnetic field sensing elements, generally in combination with other circuits. The magnetic field sensor can be, for example, a rotation detector, a movement detector, a current sensor, or a proximity detector. Functional circuits 110 can include sensing elements (also known as transducers) that allow device 112 to convert one form of energy to another form of energy. For example, functional circuits 110 can include one or more magnetic field sensing elements such as Hall effect elements, magnetoresistance elements, photo-diodes, or any combination thereof—to name a few examples. Functional circuits 110 may be configured to sense a parameter (such as a magnetic field, temperature, light, or any combination thereof) associated with a target (not shown, such as a magnet, ferromagnetic object, current conductor, etc.) and generate an output signal representative of the parameter for coupling to and further processing by a processor (such as a digital signal processor ("DSP")).

In embodiments, device 112 can be exposed to an EOS condition or event at one or more terminals 106, 108. An EOS condition or event can include, but is not limited to, a transient condition (e.g. fast voltage transients, surge currents, slow voltage transients, etc.), electrostatic discharge ("ESD") event (e.g. charge device model ("CDM") pulses, machine model ("MM") pulses, human body model ("HBM") pulses, etc.), conducted immunity condition, or any combination thereof. When device 112 is exposed to an EOS condition or event, currents and/or voltages associated with the EOS condition or event may interfere with the operation of and/or physically damage the circuitry of device 112 (e.g. functional circuits 110). For example, an ESD event may occur across pins 106 and 108 and the currents and/or voltages associated with the ESD event which may interfere with or damage functional circuits 110.

EOS protection circuitry 103 is configured to protect device 112 from damaging currents associated with an EOS condition or event and includes analog and/or digital circuitry configured to detect an EOS condition or event. In embodiments, EOS protection circuitry is configured to behave as a substantially open circuit (i.e. having an impedance necessary to substantially function as an open circuit) when no EOS condition or event is detected. In other words, EOS protection circuitry 103 operates as a substantially open circuit during normal operation of device 112. When an EOS condition or event is detected, EOS protection circuitry 103 is configured to allow at least a portion of a current associated with the EOS condition or event to flow through EOS protection circuitry 103. By allowing the current associated with the EOS condition or event to flow through EOS protection circuitry 103, the current is directed away from functional circuits 110, which aids in preventing interference with and/or damage of functional circuits 110.

In embodiments, EOS protection circuitry 103 can include one or more resistors, capacitors, inductors, or any combination thereof. EOS protection circuitry 103 is configured to detect an EOS event between at least two terminals 106, 108 according to the values of its resistors, capacitors, and/or inductors. In embodiments, EOS protection circuitry 103 can detect an EOS condition or event between terminals by determining that a rise time of a voltage on one or more terminals 106, 108 is above a predetermined threshold level. The predetermined threshold level includes a predetermined rise time according to the values of the resistors, capacitors, and/or inductors of EOS protection circuitry 103. One of ordinary skill in the art will appreciate that desired predetermined threshold levels can be achieved through the selection of the resistors, capacitors, and/or inductors of EOS protection circuitry 103 necessary to achieve the desired predetermined threshold levels.

Power clamp 102 is configured to protect device 112 from voltages associated with EOS conditions or events and includes one or more power clamp units. Each power clamp unit includes analog and/or digital circuitry configured to clamp, or limit, a level of a voltage presented to functional circuits 110 to a predetermined clamp voltage. The voltage presented to functional circuits 110 can include a voltage provided to device 112 by an external power source (e.g. VCC) and/or a voltage associated with an EOS condition or event. That is to say, power clamp 102 is configured to ensure that the level of the voltage presented to functional circuits 110 does not rise above the predetermined clamp voltage. Clamping, or limiting, the level of the voltage presented to functional circuits 110 aids in ensuring that the voltage presented to functional circuits 110 does not interfere with or damage functional circuits 110.

In embodiments, each power clamp 102 has an associated respective clamp voltage.

In embodiments, power clamp 102 is configured to detect when a level of a voltage presented to functional circuits 110 rises above a predetermined clamp voltage. When the level of the voltage presented to functional circuits 110 rises above the predetermined clamp voltage, power clamp 102 is configured to clamp the level of the voltage presented to functional circuits 110 to the predetermined clamp voltage.

Power clamp 102 can include, but is not limited to, one or more diodes, Zener diodes, voltage sources, current sources, or any combination thereof. In embodiments, the clamp voltage of power clamp 102 includes a voltage level according to the values of diodes, Zener diodes, voltage sources and/or current sources of the power clamp unit. One of ordinary skill in the art will appreciate that desired clamp voltages can be achieved by selecting values of the Zener diodes, voltage sources, and/or current sources of power clamp 102 necessary to achieve the desired clamp voltage.

Figure 1A:
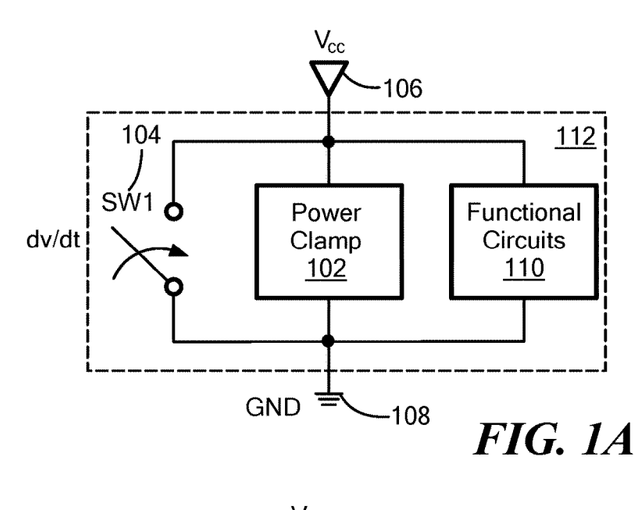
FIG. 1A is a block diagram of an example circuit for EOS protection.
Figure 1B:
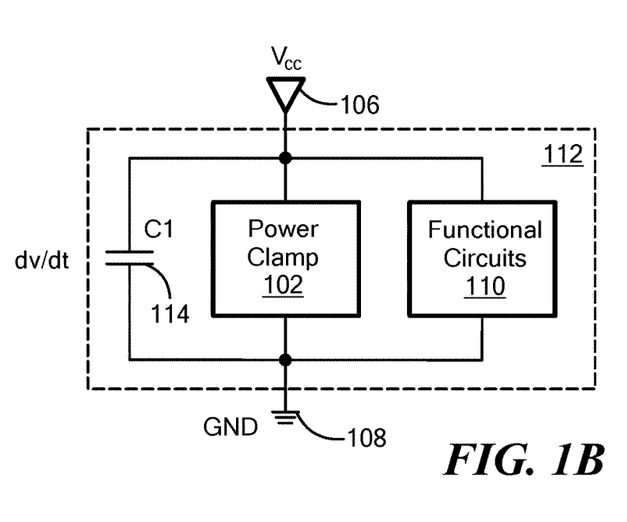
FIG. 1B is a block diagram of an example circuit for EOS protection.
Figure 1C:
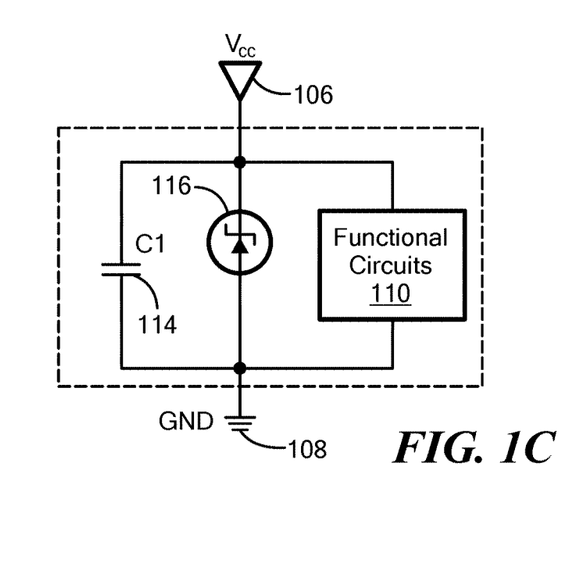
FIG. 1C is a block diagram of an example circuit for EOS protection.

Referring now to FIGS. 1A-C, example configurations for EOS protection circuitry and power clamps similar or the same as EOS protection circuitry 103 and power clamp 102, respectively, as discussed above in FIG. 1 are provided.

In the example embodiment of FIG. 1A, EOS protection circuitry 103 includes switch 104. When device 112 is operating normally (i.e. when no EOS condition or event has been detected) switch 104 is an open position. When an EOS condition or event is detected (i.e. when the rise time of a voltage associated with an EOS condition or event is greater than a predetermined threshold value), switch 104 is closed, essentially creating a short circuit between terminal 106 and 108. By switch 104 being in a closed position when an EOS condition or event is detected, current associated with the EOS condition or event flows through EOS protection circuitry 103 instead of functional circuits 110, thus preventing interference and/or damage of functional circuits 110.

In the example embodiment of FIG. 1B, EOS protection circuitry 103 includes capacitor C1 114. Capacitor C1 114 can be configured to function as a substantially open circuit when no EOS condition or event is detected and as a substantially closed circuit when an EOS condition or event is detected. For example, capacitor C1 114 can behave as a short circuit when the rise time of a voltage across the capacitor is greater than a predetermined threshold value. One of ordinary skill in the art will appreciate that a desired predetermined threshold value can be achieved by selecting a value for capacitor C1 114 necessary to achieve the desired predetermined threshold value.

In the example embodiment of FIG. 1C, EOS protection circuitry 103 is includes capacitor C1 114 and power clamp 102 includes a power clamp unit represented as Zener diode 116. As discussed above with reference to FIG. 1B, capacitor C1 114 can function as a substantially open or closed circuit based upon whether an EOS condition or event has been detected.

When device 112 is operating normally (i.e. no EOS condition of event has been detected), Zener diode 116 is configured to only allow current to flow in a predetermined direction (e.g. due to the orientation of Zener diode 116). By only allowing current to flow in a predetermined direction, current associated with VCC only flows to functional circuits 110 rather than through power clamp 102. When an EOS condition or event is detected, Zener diode 116 can be configured to clamp the voltage associated with the EOS condition or event to a clamp voltage. In embodiments, the clamp voltage can be based upon the breakdown voltage of Zener diode 116 (e.g. approximately equal to the breakdown voltage). In other words, Zener diode 116 can clamp the voltage associated with an EOS condition or event based upon its breakdown voltage. One of ordinary skill in the art will appreciate that a desired clamp voltage can be achieved by selecting the necessary values for Zener diode 116.

Figure 2:
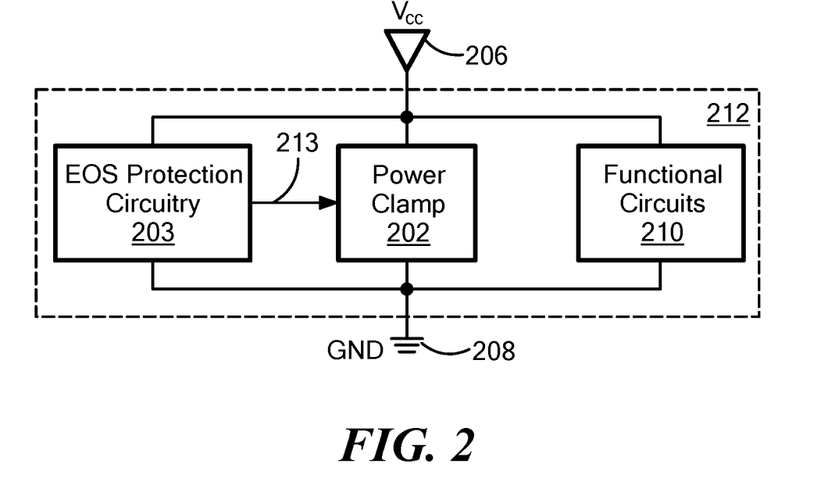
FIG. 2 is a block diagram of a circuit configured for EOS triggered power clamping, according to disclosure.

Referring now to FIG. 2, an electronic device 212, as may take the form of an IC, is configured for adjustable EOS triggered power clamping and includes EOS protection circuitry 203, power clamp 202, and functional circuits 210. In embodiments, device 212 can be coupled between first and second terminal 206, 208 similar or the same as terminals 106, 108 discussed above in FIG. 1. Device 212 can take then form of a sensor and can include functional circuits 210 similar or the same as functional circuits 110 as discussed above in FIG. 1.

In embodiments, EOS protection circuitry 203 is configured to adjust the clamp voltage of power clamp 202 when an EOS event or condition is detected by EOS protection circuitry 203. For example, EOS protection circuitry 203 can be configured to adjust the clamp voltage of power clamp 202 to a predetermined clamp voltage when an EOS event is detected and adjust the clamp voltage of power clamp 202 to a different predetermined clamp voltage when an EOS event is not detected.

In embodiments, an EOS condition or event can occur between at least two terminals 206, 208. EOS protection circuitry 203 is configured to protect device 212 from damaging currents associated with an EOS condition or event and includes analog and/or digital circuitry configured to detect an EOS condition or event. In embodiments, EOS protection circuitry 203 includes adjustment circuitry. The adjustment circuitry includes analog and/or digital circuits configured to adjust the clamp voltage when an EOS condition or event is detected. Line 213 represents control of the clamp voltage of power clamp 202 provided by adjustment circuitry of EOS protection circuitry 213. In embodiments, line 213 can include an analog or digital signal that indicates that an EOS condition or event has been detected and/or that controls a clamp voltage associated with power clamp 202.

In embodiments, EOS protection circuitry 203 can include one or more resistors, capacitors, inductors, or any combination thereof. EOS protection circuitry 203 is configured to detect an EOS event between at least two terminals 206, 208 according to the values of its resistors, capacitors, and/or inductors. In embodiments, EOS protection circuitry 203 can detect an EOS condition or event between terminals by determining that a rise time of a voltage on one or more terminals 106, 108 is above a predetermined threshold level. The predetermined threshold level includes a predetermined rise time according to the values of the resistors, capacitors, and/or inductors of EOS protection circuitry 203. One of ordinary skill in the art will appreciate that desired predetermined threshold levels can be achieved through the selection of the resistors, capacitors, and/or inductors of EOS protection circuitry 203 necessary to achieve the desired predetermined threshold levels.

In embodiments, power clamp 202 is configured to detect when a level of a voltage presented to functional circuits 210 rises above a predetermined clamp voltage. When the level of the voltage presented to functional circuits 210 rises above the predetermined clamp voltage, power clamp 202 is configured to clamp the level of the voltage presented to functional circuits 110 to the predetermined clamp voltage. In embodiments, power clamp 202 is configured to receive and/or respond to adjustment signal 213 or other control by EOS protection circuitry 203 to adjust its clamp voltage to one or more predetermined voltages accordingly.

Power clamp 202 can include, but is not limited to, one or more diodes, Zener diodes, voltage sources, current sources, or any combination thereof. In embodiments, a first clamp voltage of power clamp 202 includes a voltage level according to the values of diodes, Zener diodes, voltage sources and/or current sources of the power clamp unit. One of ordinary skill in the art will appreciate that desired first clamp voltages can be achieved by selecting values of the Zener diodes, voltage sources, and/or current sources of power clamp 102 necessary to achieve the desire clamp voltage.

Figure 2A:
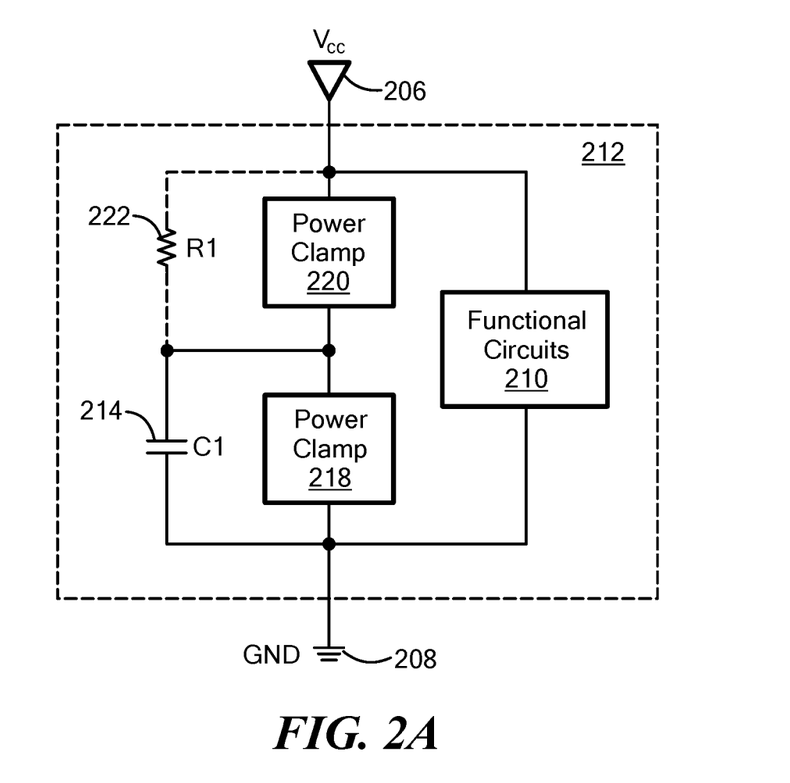
FIG. 2A is a block diagram of a circuit with an example EOS protection circuitry, according to some embodiments.
Figure 2B:
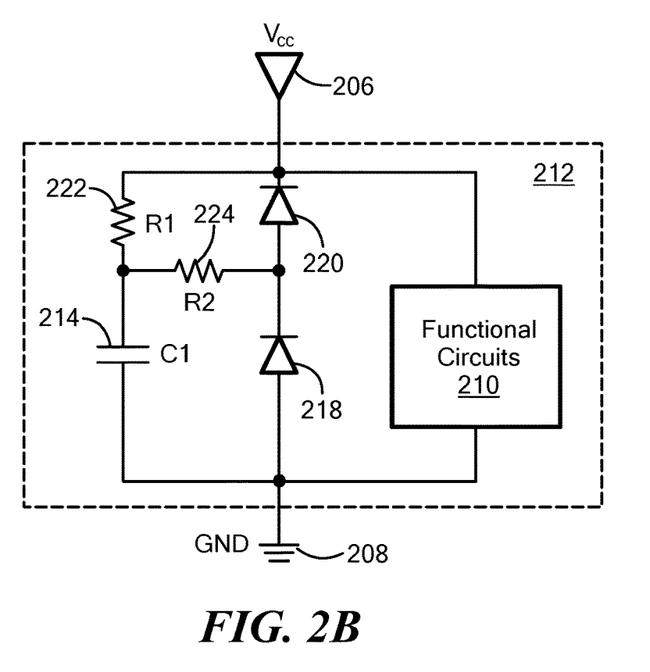
FIG. 2B is a block diagram of a circuit with an example power clamp, according to some embodiments.

FIGS. 2A and 2B present example configurations for device 212 that include EOS protection circuitry 203 configured to adjust the clamp voltage of power clamp 202.

In FIG. 2A, EOS protection circuitry 203 includes capacitor C1 214 (the same or similar as capacitor C1 114 as discussed above with reference to FIG. 1) and power clamp 202 includes power clamp unit 218, coupled to capacitor C1 214, and power clamp unit 220. Power clamp unit 218 and power clamp unit 220 are each configured to clamp a voltage presented to functional circuits 110 to a respective clamp voltage.

When device 212 is operating normally (i.e. no EOS condition or event has been detected) capacitor C1 214 operates as a substantially open circuit. With capacitor C1 214 operating as a substantially open circuit, the clamp voltage of power clamp 202 is based upon the clamp voltages of power clamp unit 218 and power clamp unit 220 (e.g. the aggregate of the clamp voltages of power clamp unit 218 and power clamp unit 220).

When an EOS condition or event is detected, capacitor C1 214 operates as a substantially short circuit. With capacitor C1 214 operating as a substantially short circuit, power clamp unit 218 is essentially shorted out and the clamp voltage of power clamp 202 is only based upon the clamp voltage of power clamp unit 220. In other words, with capacitor C1 214 operating as a substantially short circuit, the clamp voltage of power clamp 202 is adjusted from a first clamp voltage to a second clamp voltage.

In embodiments, EOS protection circuitry 203 can also include resistor R1 222. As discussed above with reference to FIG. 2, EOS protection circuitry 203 can detect an EOS condition or event by determining that a rise time of a voltage associated with the EOS condition or event is greater than a predetermined threshold. The predetermined threshold can be based upon the time constant established by the values of R1 222 and C1 214. The RC network of resistor R1 222 and capacitor C1 214 can function as a low pass filter.

In FIG. 2B, EOS protection circuitry 203 includes resistors R1 222 and R2 224 and capacitor C1 214. EOS protection circuitry 203 is configured to detect an EOS condition or event according to the values of R1 222, R2 224, and capacitor C1 214, as discussed above with reference to FIG. 2A. Resistor R2 represents a short between the node interconnecting power clamp unit 218 and power clamp unit 220 and the top of capacitor C1.

Power clamp 202 includes a first power clamp unit (represented here as diode 218) and a second power clamp unit (represented here as diode 220) with each power clamp unit configured to clamp a voltage presented to functional circuits 210 to a respective clamp voltage based upon the respective values of diode 218 and diode 220. For example, the clamp voltage of diode 218 can be based upon the breakdown voltage of diode 218.

In embodiments, the first and second power clamp units (here presented as diodes 218, 220, respectively) can comprise Zener diodes or other suitable elements or networks of elements configured to clamp the voltage presented to functional circuits 210.

When device 212 is operating normally (i.e. no EOS condition or event has been detected) capacitor C1 214 operates as a substantially open circuit and the clamp voltage of power clamp 202 is based upon the clamp voltages of diode 218 and diode 220 (e.g. the aggregate value of the clamp voltages).

When an EOS condition or event is detected, capacitor C1 214 operates as a substantially short circuit essentially shorting out diode 218. Thus, the clamp voltage of power clamp 202 is based upon only the clamp voltage of diode 220.

Figure 2C:
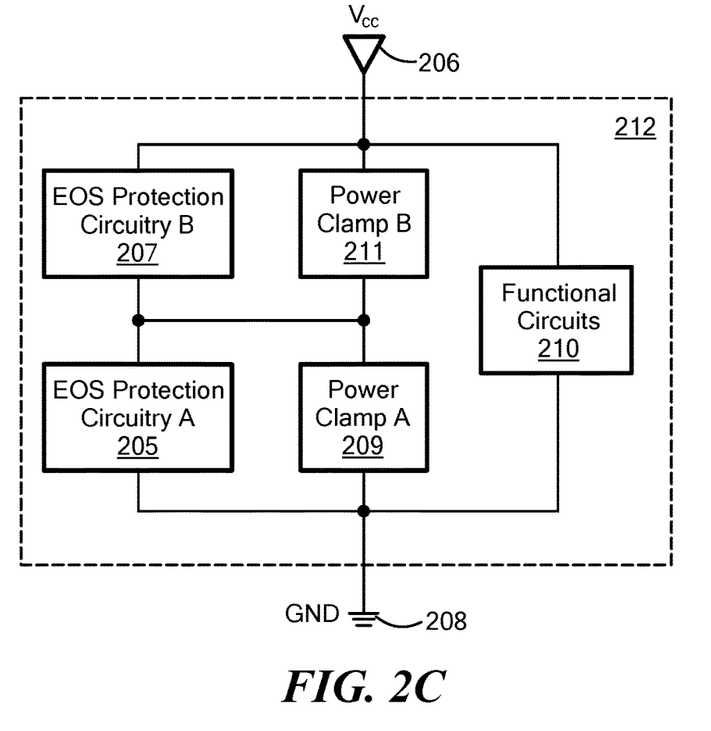
FIG. 2C is a block diagram of a circuit configured for EOS triggered power clamping based upon a type of EOS event, according to some embodiments.

Referring now to FIG. 2C, EOS protection circuitry 203 can be configured to adjust the clamp voltage of power clamp 202 to one or more predetermined clamp voltages based upon a type of EOS condition or event detected. For example, EOS protection circuitry 203 can be configured to adjust the clamp voltage of power clamp 202 to a first predetermined clamp voltage when an ESD event is detected and to a second predetermined clamp voltage when a transient is detected.

In the illustrative embodiment of FIG. 2C, EOS protection circuitry 203 includes EOS protection circuitry A 205 and EOS protection circuitry B 207 each similar or the same as EOS protection circuitry 203 as discussed above. Power clamp 202 includes power clamp unit A 209 and power clamp unit B 211 each having a respective clamp voltage.

In embodiments, EOS protection circuitry A 205 is configured to detect a first type of EOS condition or event and EOS protection circuitry B 207 is configured to detect a second, different, type of EOS condition or event. For example, EOS protection circuitry A 205 can be configured to detect an ESD event and EOS protection circuitry B 207 can be configured to detect a transient. When device 212 is operating normally (i.e. no ESD event or transient has been detected) both EOS protection circuitry A 205 and B 207 operate as substantially open circuits. As EOS protection circuitry A 205 and B 207 operate as substantially open circuits, the clamp voltage of power clamp 202 is based upon the clamp voltage of power clamp unit A 209 and power clamp unit B 211.

When an ESD event is detected, EOS protection circuitry A 205 is configured to operate as a substantially short circuit that essentially shorts power clamp unit A 209. Because power clamp unit A 209 is essentially shorted, the clamp voltage of power clamp 202 is adjusted to a first clamp voltage based upon the clamp voltage of power clamp unit B 211. When a transient is detected, EOS protection circuitry B 207 is configured to operate as a substantially short circuit that essentially shorts power clamp unit B 211. Because power clamp unit B 211 is essentially shorted, the clamp voltage of power clamp 202 is adjusted to a second clamp voltage based upon the clamp voltage of power clamp unit A 209.

By adjusting the clamp voltage of power clamp 202 based upon the type of EOS condition or event detected, voltages associated with those types of EOS conditions or events can be clamped to prevent interference and/or damage to functional circuits 210.

Figure 3:
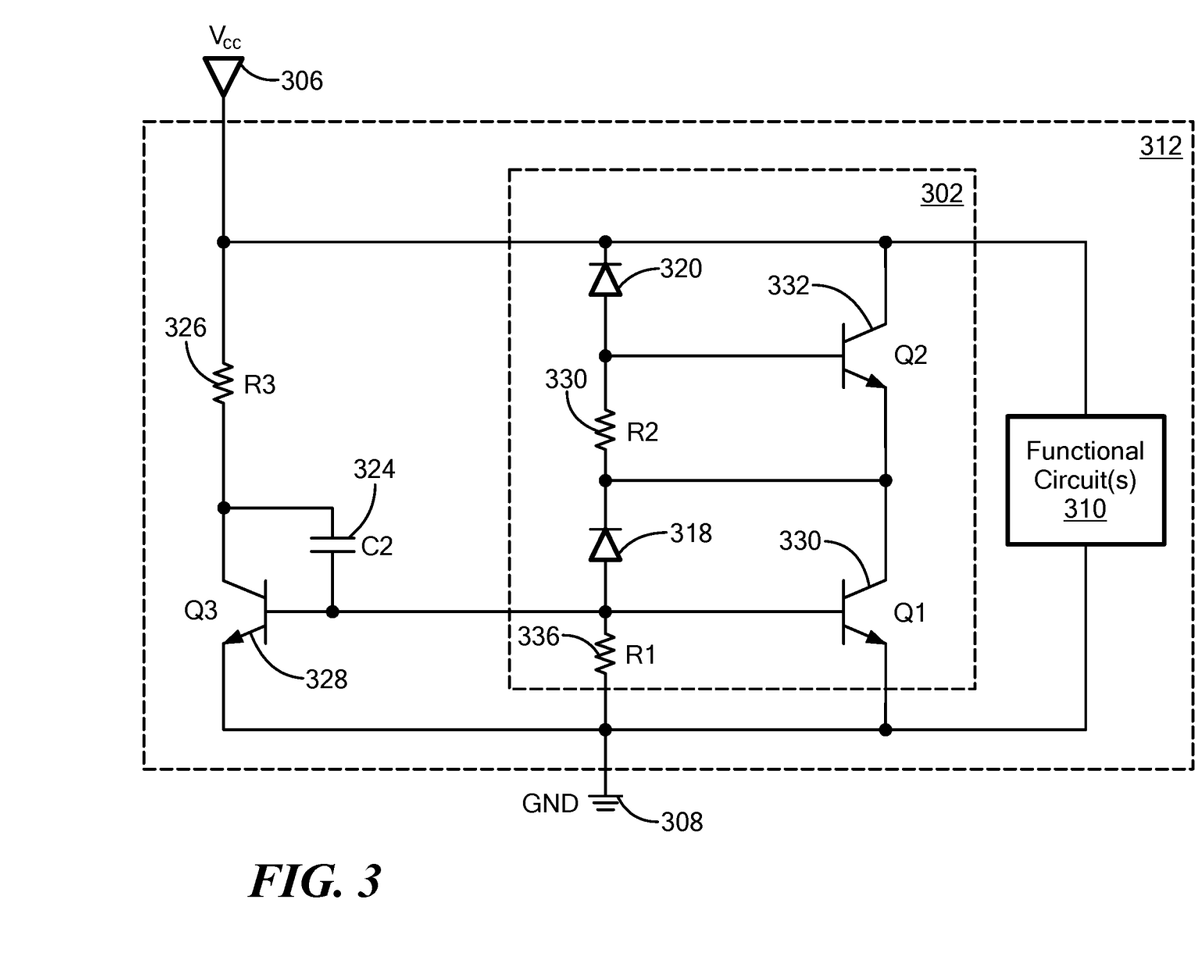
FIG. 3 is a schematic of a circuit configured for EOS triggered power clamping, according to some embodiments.

Referring now to FIG. 3, an electronic device 312, as may take the form of an IC, is configured to adjust the clamp voltage of power clamp 302 based upon EOS protection circuitry includes EOS protection circuitry including resistor R3 326, capacitor C2 324, and adjustment circuitry that includes transistor Q3 328. Resistor R3 sets the time constant for the dv/dt circuit. Resistors R1 and R2 bias transistors Q1 and Q2 and limit the current for the power clamp units 318 and 320.

EOS protection circuitry can be configured to detect an EOS condition or event based upon the values of R3 326 and capacitor C2 324. In embodiments, capacitor C2 324 is coupled between two terminals of transistor Q3 328. In the illustrative embodiment of FIG. 3, capacitor C2 324 is coupled between the base and collector of transistor Q3 328. Transistor Q3 328 can include a BJT, nMOSFET, pMOSFET, jMOSFET, Darlington transistor, or any combination thereof—to name a few.

Power clamp 302 includes a first power clamp unit (represented here as diode 318) and a second power clamp unit (represented here as diode 320) each with a respective clamp voltage and each coupled to one or more transistors. In the illustrative embodiment of FIG. 3, diode 318 is coupled to transistor Q1 330 and diode 320 is coupled to transistor Q2 332. Transistors Q1 330 and Q2 332 can each include a BJT, nMOSFET, pMOSFET, jMOSFET, Darlington transistor, or any combination thereof—to name a few.

In embodiments, at least one of power clamp's 302 transistors 330, 332 is coupled to at least one transistor Q3 of the EOS protection circuitry. In the illustrative embodiment of FIG. 3, transistor Q1 330 of power clamp 302 is coupled to transistor Q3 328 of the EOS protection circuitry. In embodiments, the EOS protection circuitry transistor is coupled to the power clamp transistor(s) so that the EOS protection circuitry transistor is configured to drive the coupled power clamp transistor(s). Driving the power clamp transistor(s) can include causing them to operate as a substantially open circuit, a substantially closed circuit, placing them in a saturation region, placing them in a cut-off region, or any combination thereof—to name a few examples.

When no EOS condition or event is detected, capacitor C2 324 operates as a substantially open circuit. As capacitor C2 324 operates as a substantially open circuit, transistor Q3 328 is also configured to operate as a substantially open circuit. By acting as a substantially open circuit, transistor Q3 328 is configured to drive transistor Q1 330 to operate as a substantially open circuit (e.g. by placing transistor Q1 330 in a cut-off region). Because transistor Q1 330 operates as a substantially open circuit, the clamp voltage of power clamp 302 is based upon the clamp voltage of diode 318 and the clamp voltage of diode 320 (e.g. the aggregate value of the clamp voltages of diodes 318 and 320).

When an EOS condition or event is detected, capacitor C2 324 operates as a substantially short circuit. By capacitor C2 324 operating as a substantially short circuit, transistor Q3 328 operates as a substantially short circuit (e.g. by being placed in a saturation region). In the illustrative embodiment of FIG. 3, when capacitor C2 324 operates as a substantially short circuit, the base of transistor Q3 328 is coupled to VCC via resistor R3 326, placing transistor Q3 328 into a saturation region.

As the EOS condition or event is detected, transistor Q3 328 is configured to generate an adjustment signal that is provided to at least one of the transistors of power clamp 302. When the adjustment signal is received by the power clamp transistors, the power clamp transistor operates as essentially short circuits which essentially shorts the diodes coupled to the power clamp transistors. In the illustrative embodiment of FIG. 3, as transistor Q3 328 operates as a substantially short circuit, the collector of power clamp transistor Q1 330 is coupled to VCC via R3 326 which places power clamp transistor Q1 330 into a saturation region.

As the power clamp diodes are shorted, the clamp voltage of power clamp 302 is adjusted according to the clamp voltages of the power clamp diodes that have not been shorted.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures but should be understood.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An electronic device having first and second terminals, comprising:
    an electrical overstress (EOS) protection circuitry configured to detect an EOS event at one or both of the first and second terminals; and
    a power clamp coupled to the electrical overstress (EOS) protection circuitry, wherein the power clamp is configured to clamp a voltage between the first terminal and the second terminal, wherein the power clamp comprises at least a first diode and a second diode coupled in series between the first terminal and the second terminal and at least a first transistor coupled in parallel with the first diode and a second transistor coupled in parallel with the second diode,
    wherein the electrical overstress (EOS) protection circuitry includes adjustment circuitry configured to adjust a clamp voltage of the power clamp in response to an EOS event from an initial clamp voltage to a reduced clamp voltage, and
    wherein the initial clamp voltage of the power clamp is based at least in part on a breakdown voltage of at least the first and second diodes and is adjusted to the reduced clamp voltage by the adjustment circuitry turning on the first transistor to thereby couple a short circuit path across the first diode and keeping the second transistor turned off, wherein the reduced clamp voltage is based on a breakdown voltage of the second diode.

2. The electronic device of claim 1, wherein the first and second terminals are a power input terminal and a ground terminal.

3. The electronic device of claim 1, wherein the EOS event comprises one or more of a transient, an electrostatic discharge (ESD), or conducted immunity.

4. The electronic device of claim 1, wherein the adjustment circuitry includes a capacitor that is coupled in parallel with a third transistor, the capacitor being arranged to behave as an open circuit in the absence of EOS events.

5. The electronic device of claim 1, wherein the EOS protection circuitry comprises at least one resistor and at least one capacitor and wherein the EOS protection circuitry is configured to detect the EOS event based upon values of the at least one resistor and at least one capacitor.

6. A method comprising:
    detecting, with an electrical overstress (EOS) protection circuitry, an EOS event at one or both of first and second terminals of an electronic device; and
    clamping, with a power clamp comprising a first diode and a second diode coupled in series between the first and second terminals and at least a first transistor coupled in parallel with the first diode and a second transistor coupled in parallel with the second diode, a voltage between the first terminal and the second terminal to a first level when an EOS event has not been detected, wherein the first level is based on a breakdown voltage of the first and second diodes, and
    clamping the voltage between the first terminal and the second terminal to a second level, lower than the first level when an EOS event has been detected by turning on the first transistor to thereby couple a short circuit path across the first diode and keeping the second transistor turned off, wherein the second level is based on a breakdown voltage of the second diode.

7. The method of claim 6, wherein the first and second terminals are a power input terminal and a ground terminal.

8. The method of claim 6, where in the EOS event comprises one or more of a transient, an electrostatic discharge (ESD), or conducted immunity.

9. The method of claim 6, further comprising clamping, with the power clamp, the voltage between the first and second terminals to a predetermined level based upon a type of EOS event detected.

10. A system for electrostatic discharge (EOS) protection, comprising:
    means coupled between a first terminal and a second terminal for detecting an EOS event; and
    means for clamping a voltage between the first terminal and the second terminal comprising at least a first diode and a second diode coupled in series between the first terminal and the second terminal and at least a first transistor coupled in parallel with the first diode and a second transistor coupled in parallel with the second diode; and
    means coupled to the EOS event detecting means for adjusting the clamp voltage of the clamping means from an initial clamp voltage based on a breakdown voltage of the first and second diodes to a reduced clamp voltage that is lower than the initial clamp voltage by turning on the first transistor to thereby couple a short circuit path across the first diode and keeping the second transistor off, wherein the reduced clamp voltage is based on a breakdown voltage of the second diode.

11. The system for EOS protection of claim 10, wherein the clamp voltage adjusting means comprises a capacitor coupled in parallel with a third transistor, wherein the capacitor is arranged to behave as an open circuit in the absence of EOS events.

12. The system for EOS protection of claim 11, wherein the first and second terminal are a power input terminal and a ground terminal.

* * * * *

UNITED STATES PATENT AND TRADEMARK OFFICE
CERTIFICATE OF CORRECTION

PATENT NO. : 11,303,116 B2
APPLICATION NO. : 16/115901
DATED : April 12, 2022
INVENTOR(S) : Washington Lamar et al.

It is certified that error appears in the above-identified patent and that said Letters Patent is hereby corrected as shown below:

In the Specification

Column 2, Line 12 delete "features:" and replace with --features.--.

Column 2, Lines 63-64 delete "coupled at least power" and replace with --coupled at least one power--.

Column 3, Line 8 delete "describe" and replace with --described--.

Column 3, Line 35 delete "to disclosure;" and replace with --to the disclosure;--.

Column 3, Line 64 delete "at at" and replace with --and at--.

Column 4, Line 8 delete "at at" and replace with --and at--.

Column 5, Line 67 delete "terminal" and replace with --terminals--.

Column 6, Line 20 delete "103 is includes" and replace with --103 includes--.

Column 6, Line 48 delete "terminal" and replace with --terminals--.

Column 6, Line 50 delete "take then" and replace with --take the--.

Column 7, Line 6 delete "213." and replace with --203.--.

Column 7, Line 18 delete "106, 108" and replace with --206, 208--.

Column 7, Line 33 delete "110" and replace with --210--.

Signed and Sealed this
Twenty-sixth Day of September, 2023

Katherine Kelly Vidal
*Director of the United States Patent and Trademark Office*

CERTIFICATE OF CORRECTION (continued)
U.S. Pat. No. 11,303,116 B2

Column 7, Line 47 delete "102" and replace with --202--.

Column 7, Line 58 delete "110" and replace with --210--.